United States Patent [19]

Geus et al.

[11] Patent Number: 5,143,877
[45] Date of Patent: Sep. 1, 1992

[54] PROCESS FOR PREPARATION OF A CATALYST

[75] Inventors: John W. Geus, Bilthoven; Eliza Boellaard, Breukelen, both of Netherlands

[73] Assignee: Shell Oil Company, Houston, Tex.

[21] Appl. No.: 668,829

[22] Filed: Mar. 13, 1991

[30] Foreign Application Priority Data

Mar. 16, 1990 [GB] United Kingdom ............... 9005964

[51] Int. Cl.$^5$ .............................................. B01J 27/26
[52] U.S. Cl. ...................................... 502/60; 502/200
[58] Field of Search ............................ 502/200, 60

[56] References Cited

U.S. PATENT DOCUMENTS

| | | | |
|---|---|---|---|
| 4,146,503 | 3/1979 | Vogt et al. | 252/455 R |
| 4,172,053 | 11/1979 | Vogt et al. | 252/447 |
| 4,186,112 | 1/1980 | Vogt et al. | 252/471 |
| 4,237,063 | 12/1980 | Bell et al. | 260/449 R |
| 4,347,164 | 8/1982 | Scherzer | 252/455 Z |
| 4,394,298 | 7/1983 | Nowack et al. | 252/438 |
| 4,588,705 | 5/1986 | Vanderspurt et al. | 502/177 |

FOREIGN PATENT DOCUMENTS 2653986  11/1976  Fed. Rep. of Germany .
77/7011  11/1977  South Africa .

OTHER PUBLICATIONS

J. of Cat. (71), 111–118 (1981).

*Primary Examiner*—W. J. Shine

[57] ABSTRACT

Process for the preparation of one or more metal or metal compounds containing catalysts or catalyst precursors wherein a complex cyanide of the general formula $M_1M_2(CN)_{p-x}(Y)_x$ wherein $M_1$ represents a cationic moiety comprising one or more metal ions, $NH_4^+$ and/or a quaternary ammonium ion, $M_2$ forms part of the anionic moiety and represents one or more polyvalent metals, CN represents a cyanide moiety as defined hereinbefore, Y represents one or more ligands, p is a number ranging from 2–8, x is a number ranging from 0–4 and p/x is at least 1 when $x>0$, present on a carrier, is subjected to a decomposition treatment under oxidative conditions.

The catalysts thus obtained can be suitably applied for instance in the preparation of hydrocarbons and/or oxygenates from carbon monoxide and hydrogen and in the hydrodesulphurization of hydrocarbonaceous materials.

21 Claims, 2 Drawing Sheets

PROCESS FOR PREPARATION OF A CATALYST

BACKGROUND OF THE INVENTION

The present invention relates to the preparation of one or more metal and/or metal compounds containing catalysts or catalyst precursors starting from complex cyanides. The present invention also relates to the use of catalysts obtained from cyanide complexes in the production of hydrocarbons from carbon monoxide and hydrogen as well as in the hydrodesulphurisation of hydrocarbonaceous materials.

One of the problems often encountered in the manufacture of metal-containing heterogeneous catalysts is the phenomenon of reaction of the metal ion(s) to be incorporated on the carrier with the carrier. This can already happen during the initial contact of the metal ion(s) to be incorporated on the carrier and is many times observed when subjecting the appropriate metal ion(s) containing carrier to a customary thermal treatment which is normally used to transfer the system into the catalytically desired species or to stabilise the system obtained or both. In particular, it is a well-known problem for iron and/or manganese containing catalyst, but also nickel and cobalt containing catalysts are difficult to manufacture because of this unwanted tendency of metal ion/support interaction.

It should be noted that complex cyanides can be used as starting materials in the preparation of supported catalysts by firstly introducing an appropriate cyanide to a support, or alternatively precipitating a complex cyanide on a support iron a metal salt and an appropriate cyanide followed by activating the cyanide thus introduced. For instance, in U.S. Pat. specification 4,186,112 a process is described for reducing carbon monoxide by means of hydrogen using supported catalysts prepared by precipitating a polymetal salt of a hydrocyanic acid which is subjected to a so-called forming step, after separating and drying the precipitated salt. It is reported that forming takes place when thermally decomposing the salt in contact with hydrogen or a mixture of hydrogen and carbon monoxide. It is also possible to carry out the thermal decomposition under vacuum.

It is further known (J. of Cat. 71], 111–118 1981]) to produce finely dispersed metals in zeolites by reacting a metal-exchanged zeolite and an anionic, metal-containing coordination compound, specifically a water-soluble, metal cyanide complex followed by subsequent reduction with hydrogen at a temperature of 400° C.

It has now surprisingly been found that very interesting catalysts or catalyst precursors can be obtained which do not suffer (or only to a marginal extent) from unwanted metal ion/support interaction when complex cyanide containing carriers are subjected to a decomposition treatment under oxidative conditions. In general, it has been found that, especially after an activation step, more active and more stable catalysts will be obtained.

SUMMARY OF THE INVENTION

The present invention thus relates to a process for the preparation of one or more metal and/or metal compounds containing catalysts or catalyst precursors wherein a complex cyanide of the general formula $M_1M_2(CN)_{p-x}(Y)_x$ wherein $M_1$ represents a cationic moiety comprising one or more metal ions, $NH_4^+$ and/or a quaternary ammonium ion, $M_2$ forms parts of the anionic moiety and represents one or more polyvalent metals, CN represents a cyanide moiety as defined hereinafter, Y represents one or more ligands, p is a number ranging from 2–8, x is a number ranging from 0–4, and p/x is at least 1 when x>0, present on a carrier is subjected to a decomposition treatment under oxidative conditions.

The present invention further relates to a process for the preparation of hydrocarbons and/or oxygenates by contacting carbon monoxide and hydrogen with a catalyst according to the invention.

The invention still further relates to a process for the hydrodesulphurisation of hydrocarbonaceous materials by contacting such materials in the presence of hydrogen at elevated temperatures and pressures with a catalyst according to the invention.

The invention also relates to a process of the production of ethylene oxide and/or ethylene glycol by using silver catalysts obtained from a complex cyanide which has been subjected to decomposition treatment according to the present invention.

DESCRIPTION OF PREFERRED EMBODIMENTS

Figure 1:
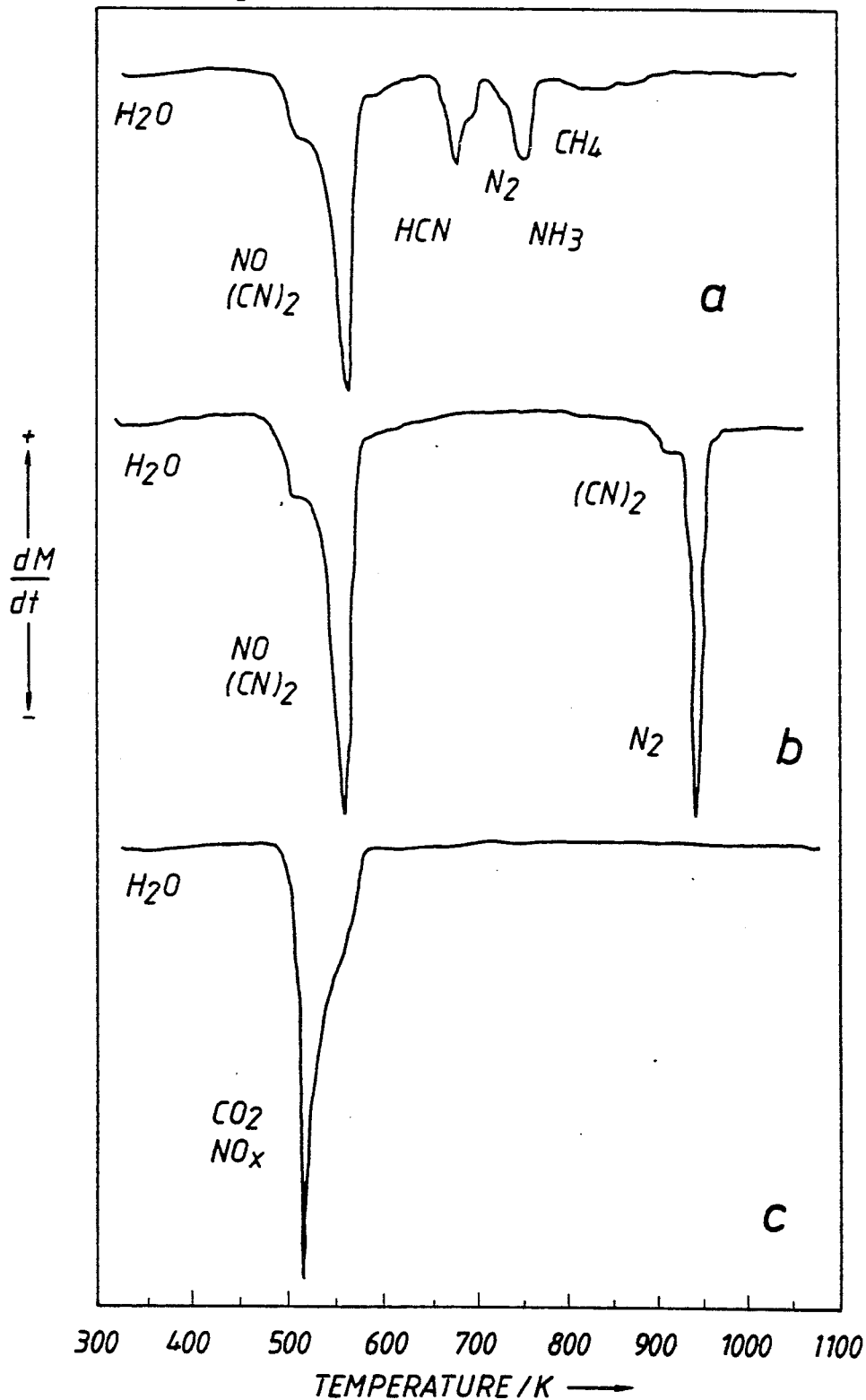
FIG. 1 is a graphical representation of the decomposition of copper/iron complex cyanide with part c under oxidative conditions according to the invention and parts a and b, not under oxidative conditions, for comparison.
Figure 2:
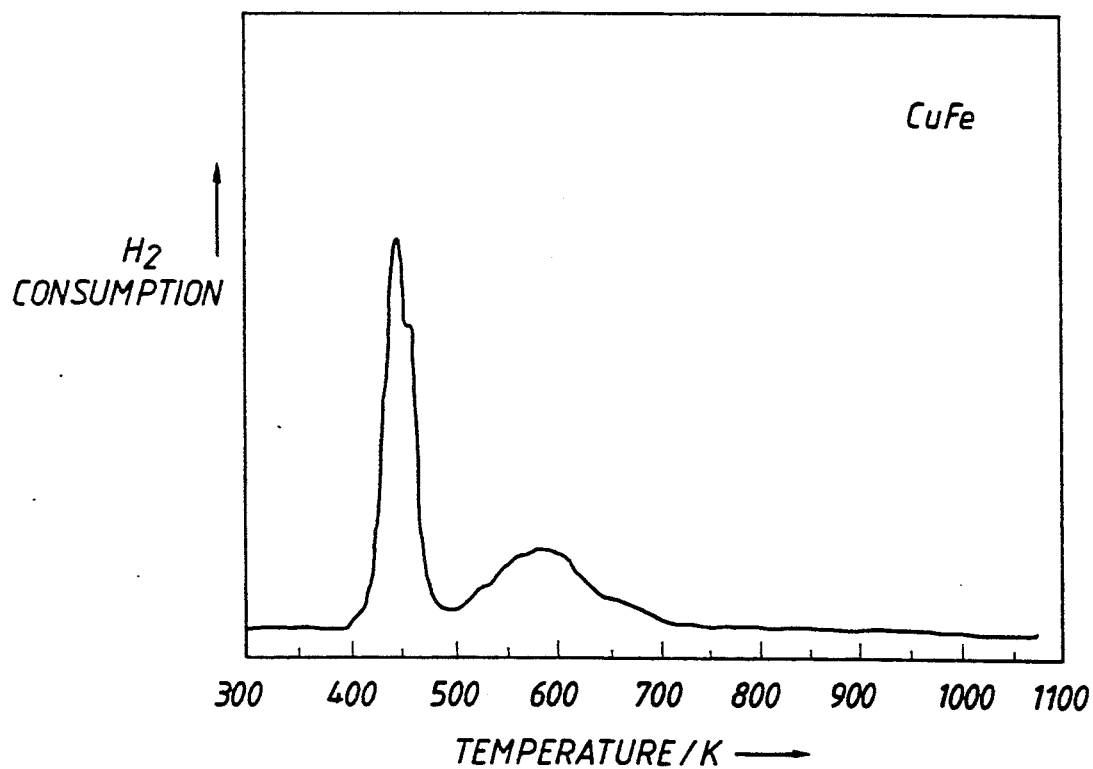
FIG. 2 is a graphical representation of hydrogen consumption of a copper/iron catalyst according to the invention.

The decomposition treatment under oxidative conditions to be specified hereinafter can be suitably carried out at a temperature of at least 200° C. Preference is given to a temperature between 250° C. and 450° C. The optimum temperature to be applied depends to some extent on the type and number of metal moieties present in the complex cyanide containing carrier.

Suitably the decomposition treatment is carried out in an environment containing at least 0.5% by volume of an oxidising agent. It is also possible, and in fact preferred to use an environment containing a larger amount of oxidising agent. Preference is given to the use of (diluted) air as oxidising agent Examples of oxidising agents comprise oxygen, ozone and hydroperoxides. The environment containing the oxidative agent normally comprises an inert medium, such as an inert gaseous compound such as nitrogen, argon or helium. Preferably, air is used to perform the decomposition treatment in accordance with the present invention.

The complex cyanide containing carrier is suitably subjected to the decomposition treatment according to the present invention when present in a closed vessel with venting facilities such as an autoclave or a rotating kiln.

Complex cyanides present on carriers which can be subjected to the decomposition process in accordance with the present invention can be represented by the general formula $M_1M_2(CN)_{p-x}(Y)_x$ wherein $M_1$ and $M_2$ are as defined hereinbefore. It is possible that some interchange may take place between moieties $M_1$ and $M_2$ during the formation of the complex cyanides. It is also possible that part of the $M_1$ moiety is replaced by H+, e.g. by means of an ion-exchange procedure. When $M_1$ represents a quaternary ammonium ion preference is given to the lower quaternary alkyl ammonium ions such as tetramethyl. tetraethyl and dimethyl diethyl ammonium ions. The presence of quaternary ammonium ions may have an advantageous effect when non-aqueous impregnation methods are envisaged.

The expression "a cyanide moiety" as used throughout the present specification is meant to include apart from the cyano group (the cyanide group proper) also the isocyano group, the thiocyano group, the isothiocyano group, the cyanato group and the isocyanato group. Preference is given to the presence of the cyanide group proper in the complex cyanide structure.

Depending on the coordinative preferences of the (various) metal(s) present in the complex cyanide, the number for p can range from 2–8. Also the number of Y moieties present has a bearing on the value for p. Preferably, p represents an even number in particular 4, 6 or 8. For complex cyanides having $M_2$ representing palladium, p is equal to 4, for complex cyanides having $M_2$ representing iron, p is equal to 6 and for complex cyanides having $M_2$ representing molybdenum, p is equal to 8.

The Y moiety suitably represents one or more of NO, CO, $NH_3$, $NO^+$ or $NO_2^-$. Suitably Y represents one or more NO moieties. Suitably up to four ligands Y can be present in the complex cyanides provided that the ratio p/x is at least 1 when $x \times 0$. Preference is given to complex cyanides containing not more than 2 and in particular no ligands Y.

Without wishing to be bound to any particular theory it should be noted that the surprising activity and performance of catalysts produced in accordance with the decomposition treatment under oxidative conditions may be related to the observation that water present in the complex cyanides when precipitated on the appropriate carrier is preferentially removed prior to the decomposition treatment according to the present invention. When the cyanide group is decomposed in the substantial absence of water apparently a decomposition mechanism applies which substantially prevents the unwanted interaction between the metal(s) remaining on the carrier and the sites on the carrier normally exposed to undergo metal/site interaction.

The process according to the present invention is suitably carried out by using a complex cyanide wherein $M_1$ represents one or more transition metal moieties, a Group IVa metal moiety, a Group Ia or IIa metal moiety and/or $NH_4^+$, a Group Ib or IIb metal moiety, $M_2$ represents a Group VIb or Group VIII metal moiety, CN represents cyanide, p represents 4, 6 or 8 and Y represents a NO group when x is not zero.

Preferably, the process according to the present invention is carried out by using a complex cyanide wherein $M_1$ represents one or more Group VIII, one or more Group Ib or one or more Group IVa metal moieties, $M_2$ represents a Fe, Co, Ni, Mo or W metal moiety, p represents 4, 6 or 8 and x is zero. In particular, use is made of a complex cyanide wherein M represents a Cu, Ni or Co moiety and $M_2$ represents a Fe, W or Mo moiety.

As regards the various Groups of the Periodic Table of the Elements reference is made to the Handbook of Chemistry and Physics, 64th Edition, 1983 published by the Chemical Rubber Company.

Examples of complex cyanides which can be used (after having been incorporated on a carrier) as starting materials in the decomposition treatment in accordance with the present invention comprise $Cu_2Fe(II)(CN)_6$, $Fe_2Fe(II)(CN)_6$, $Ni_2Fe(II)(CN)_6$, $Ag_4Fe(II)(CN)_6$, $CuFe(II)(CN)_5(NO)$, $FePd(CN)_4$, $Cu_3[Fe(III)(CN)_6]_2$, $Co_3[Fe(III)(CN)_6]_2$, $Cu_2Mo(CN)_8$, $Co_2Mo(CN)_8$, $CuNiFe(CN)_6$ and $Mn_2Fe(II)(CN)_6$. Normally, the complex cyanides will contain water of hydration.

Suitably, refractory oxides as well as zeolites and mixtures thereof can be used as carrier for the complex cyanides to be treated according to the present invention. Examples of suitable refractory oxides comprise alumina, silica-alumina, titania, magnesia or mixtures of two or more of such refractory oxides. Good results have been obtained using alumina and titania as carrier materials. It may be useful to subject the refractory oxides to an activating treatment prior to the incorporation of the complex cyanides thereupon.

Crystalline (metallo)silicates can also be used as carrier materials, if desired together with one or more refractory oxides. Crystalline alumino silicates are a class of crystalline (metallo) silicates which can be suitably applied.

Suitably, the process according to the present invention is carried out using of from 5% to 95% by weight of carrier, calculated on total weight of dried complex cyanide and carrier. Preference is given to the use of of from 40% to 90% by weight of carrier, calculated on total weight of dried complex cyanide and carrier.

The complex cyanides can be suitably incorporated on the appropriate carrier by in situ formation e.g. by reaction of one or more metal compounds containing $M_1$ moieties, in particular one or more salts containing $M_1$ moieties, and a cyanide containing a $M_2$ moiety.

Preferably, the complex cyanides are incorporated on the carrier by treating the appropriate carrier with one or more cyanides containing a $M_2$ moiety followed by drying and subjecting the carrier containing the cyanide to impregnation with one or more compounds containing $M_1$ moieties, in particular one or more salts containing $M_1$ moieties, so as to form the complex cyanide. It is also preferred to incorporate the complex cyanides on the appropriate carrier by treating the appropriate carrier with one or more compounds containing $M_1$ moieties, in particular one or more salts containing $M_1$ moieties, followed by drying and subjecting the carrier containing the $M_1$ moiety to impregnation with one or more cyanides containing a $M_2$ moiety so as to form the complex cyanide.

It is also possible to treat an appropriate carrier with a soluble complex cyanide and drying the thus treated carrier to produce the complex cyanide(s) containing carrier to be subjected to a decomposition treatment under oxidative conditions according to the present invention.

It is also possible to use the so-called incipient wetness impregnation method. Using that method gives the opportunity to introduce either one or more salts containing one or more $M_1$ moieties or the cyanide containing a $M_2$ moiety on the carrier.

When salts containing one or more $M_1$ metal moieties and cyanides containing a $M_2$ moiety have been introduced on the carrier which results in the formation of the appropriate complex cyanide(s) the metal moieties $M_1$ and M2 are still in non-zero valencies. By subjecting the complex cyanides to a decomposition treatment under oxidative conditions it will be clear that the cyanide moieties will be substantially destructed which will leave the $M_1$ and $M_2$ metal moieties substantially in the appropriate oxidic form.

In the event that it is desired, e.g. for catalytic purposes to have the metal moieties in substantially the zero valency state it will be necessary to subject the complex cyanides to a reducing treatment. Such a treatment which will normally activate or increase the catalytic behaviour of the catalysts can be carried out suitably in the presence of hydrogen at a temperature up to 500° C. and at a pressure of up to 10 MPa. Preferably, the reducing treatment is carried out at a temperature in the range between 50° C. and 300° C.

The complex cyanides present on a carrier which have been subjected to a decomposition treatment in accordance with the present invention can be used, either as such or after a reducing treatment as discussed hereinbefore, as catalyst precursors or as catalysts in a great many applications, depending on the character of the metal moieties $M_1$ and $M_2$. Without wishing to be bound to any particular theory it is thought that the attractive catalytic properties of the catalysts obtainable from complex cyanides as defined hereinbefore (after at least the decomposition treatment under oxidative conditions) are related to the very effective dispersion of the appropriate metal moieties throughout the system.

The present invention relates in particular to a process for the preparation of hydrocarbons and/or oxygenates from carbon monoxide and hydrogen wherein a mixture based on carbon monoxide and hydrogen is contacted with a catalyst comprising one or more catalytically active metal components on a support which catalyst has been obtained by subjecting a complex cyanide according to the general formula $M_1M_2(CN)_{p-x}(Y)_x$ wherein $M_1$ represents a cationic moiety comprising one or more metal ions, $NH_4^+$ and/or a quaternary ammonium ion, $M_2$ forms part of the anionic moiety and represents one or more polyvalent metals, CN represents a cyanide moiety as defined hereinbefore, Y represents one or more ligands, p is a number ranging from 2-8, x is a number ranging from 0-4. and p/x is at least 1 when $x > 0$, present on a carrier to a decomposition treatment under oxidative conditions.

In particular, catalysts loaded with suitable Fischer-Tropsch metal(s), e.g. Group VIII metals such as iron, nickel or cobalt, optionally containing one or more promoters such as zirconia or rhenium, can be suitably applied in the so-called heavy paraffin synthesis steps in an integrated process for the manufacture of middle distillates starting from methane to produce a syngas mixture which serves as starting material for the heavy paraffin synthesis and wherein the heavy paraffins produced are subjected to a catalytic heavy paraffin conversion process to produce the desired middle distillates. It may be advantageous to subject the complex cyanides which have been subjected to a decomposition treatment under oxidative conditions according to the present invention to a reducing treatment with hydrogen prior to their use as catalysts in Fischer-Tropsch type reactions.

The present invention further relates to a process for the hydrodesulphurisation of hydrocarbonaceous materials by contacting such materials in the presence of hydrogen at elevated temperature and pressure with a catalyst comprising one or more catalytically active metal components on a support which catalyst has been obtained by subjecting a complex cyanide according to the general formula $M_1M_2(CN)_{p-x}(Y)_x$ wherein $M_1$ represents a cationic moiety comprising one or more metal ions, $NH_4^+$ and/or one or more quaternary ammonium ions, $M_2$ forms part of the anionic moiety and represents one or more polyvalent metals, CN represents a cyanide moiety as defined hereinbefore, Y represents one or more ligands p is a number ranging from 2-8, x is a number ranging from 0-4 and p/x is at least 1 when $x > 0$, present on a carrier to a decomposition treatment under oxidative conditions.

In particular, catalysts loaded with one or more Group VIb and/or Group VIII metals, such as nickel, cobalt, molybdenum and cobalt can be suitably applied in hydrodesulphurisation processes preferably when they are in sulphided form. Suitably, a pre-sulphiding technique can be applied to the metal oxides present on the appropriate carrier after the decomposition treatment according to the present invention. It is also possible to apply an in situ sulphidation technique. Normally, the catalysts used in hydrodesulphurisation duty will also act as demetallisation catalysts and/or denitrogenation catalysts depending on the feedstock to be treated. The conditions to be applied in hydrodesulphurisation/hydrodemetallisation/hydrodenitrification processes are well known in the art and need not to be elucidated here.

The present invention also relates to a process for producing ethylene oxide and/or ethylene glycol by using supported silver catalysts. optionally containing one or more promoters, which silver catalysts have been obtained from the appropriate complex cyanide which has been subjected to a decomposition treatment according to the present invention.

The catalytic processes described hereinabove can be carried out suitably by using catalysts which have been prepared from complex cyanides as defined hereinbefore which have been subjected to a decomposition treatment according to the present invention which has been carried out in an environment containing at least 0.5% by volume of an oxidising agent at a temperature of at least 200° C. Preferably the decomposition treatment is to be carried out using (diluted) air at a temperature between 250° C. and 450° C.

Preferably, the process for preparing hydrocarbons and/or oxygenates is carried out by using a catalyst obtainable from a complex cyanide wherein $M_1$ represents one or more of Group VIII. one or more of Group Ib or one or more Group IVa metal moieties, $M_2$ represents a Fe, Co, Ni, Mo or W metal moiety, CN represents cyanide, p represents 4, 6 or 8 and x is zero. In particular, catalysts are attractive which are obtainable from complex cyanides wherein $M_1$ represents a Cu, Ni or Co moiety and $M_2$ represents a Fe, W or Mo moiety.

Preferably, the process for hydrodesulphurising hydrocarbonaceous materials is carried out by using a catalyst obtainable from a complex cyanide wherein $M_1$ represents one or more Group VIb and/or Group VIII metal moieties, $M_2$ represents a Co, Ni, Mo or W metal moiety. CN represents cyanide, p represents 4, 6 or 8 and x is zero. In particular, catalysts are attractive which are obtainable from complex cyanides wherein $M_1$ represents a Ni and/or Co metal moiety and $M_2$ represents a Mo and/or W moiety. The present invention will now be illustrated by the following Examples.

EXAMPLE 1 a) Preparation of complex cyanide 1. 2.50 grammes of $Na_2Fe(CN)_5NO.2H_2O$ were dissolved in 100 ml water and slowly injected into a solution of 2.02 grammes of Cu(NO$_3$)$_2$.3H$_2$O in 1000 ml water wherein 4.00 grammes of Al$_2$O$_3$ (Degussa Aluminum Oxid C) had been suspended. The pH of the vigorously stirred suspension was 5.0 and the temperature was 22° C. The resulting precipitate was suction-filtered, washed with 1000 ml water and vacuum dried. The product was pelletized, crushed and a fraction of 0.43–0.71 mm of the Cu/Fe-complex cyanide was selected.

2. The experiment described in Example 1a)1 was repeated using the appropriate amount of K$_4$Fe(CN)$_6$.3H$_2$O. After working up the corresponding Cu$_2$/Fe-complex cyanide was obtained.

3. The experiment described in Example 1a)1 was repeated using the appropriate amount of K$_3$Fe(CN)$_6$. After working up the corresponding Cu$_3$/Fe$_2$-complex cyanide was obtained.

b) Decomposition of complex cyanide 1. 0.05 grammes of the complex cyanide prepared as described under a)1 were placed in a thermobalance and heated at a rate of 5° C./min up to 900° C. in a flow of gas comprising 90% by volume of argon and 10% by volume of hydrogen.

The rate of weight loss (dM/dt) and the composition of the gas phase as monitored with a massspectrometer over the temperature interval are given in FIG. Ia.

2. A similar amount of complex cyanide was subjected to the treatment described in b)1 but using only argon as the gas flow The rate of weight loss and the composition of the gas phase are given in FIG. Ib.

3. A similar amount of complex cyanide was subjected to the treatment described in b)2 but using a gas comprising 90% by volume of argon and 10% by volume of oxygen. The rate of weight loss and the composition of the gas phase are given in FIG. Ic.

It will be clear that the decomposition under oxidative conditions in accordance with the present invention (experiment b)3 FIG. Ic) not only takes place at a substantially lower temperature than is required when a thermal decomposition (experiment b)2) or a decomposition under reducing conditions (experiment b)1) is envisaged but also is much more effective in removing the cyanide moieties from the complex cyanide.

c) Reduction of decomposed cyanide 0.05 grammes of the complex cyanide prepared as described under a)1 were heated at a rate of 5° C./min up to 270° C. in a flow of gas comprising 99% by volume of helium and 1% by volume of oxygen and left for 24 hours. Thereafter, the sample was placed in a fixed-bed microreactor and heated at a rate of 5° C./min up to 900° C. in a flow of gas comprising 90% by volume of argon a volume of hydrogen. The hydrogen consumption was measured with a Hot Wire Detector and depicted over the temperature interval in FIG. II.

d) Physical characterisation of the metallic phases

The sizes of the metallic phases as determined by X-ray diffraction line-broadening are summarised in Table 1.

TABLE 1

| treatment | complex (nm) | Fe phase (nm) | Cu phase (nm) |
| --- | --- | --- | --- |
| a)1 | 41 | — | — |
| b)1 | — | 26 | 78 |
| b)2 | — | 33 | 116 |

TABLE 1-continued

| treatment | complex (nm) | Fe phase (nm) | Cu phase (nm) |
| --- | --- | --- | --- |
| b)3 | — | 21 | 21 |

EXAMPLE 2

The experiment described in Example 1a)1 was repeated by dissolving 2.37 grammes of K$_4$Fe(CN)$_6$.3H$_2$O in 100 ml water and slowly injecting the solution into a solution of 1.36 grammes of Cu(NO$_3$)$_2$3H$_2$O and 1.63 grammes of Ni(NO$_3$)$_2$.bH$_2$O in 1000 ml water wherein 4.00 grammes of Al$_2$O$_3$ had been suspended. The pH of the vigorously stirred suspension was 5.0 and the temperature was 22° C. After working up the corresponding Cu/Ni/Fe-complex cyanide was obtained.

EXAMPLE 3

The experiment described in Example 1a)1 was repeated by dissolving 0.87 grammes of K$_3$Fe(CN)$_6$ in 100 ml water and slowly injecting the solution into a solution of 1.34 grammes of AgNO$_3$ in 1000 ml water wherein 4.00 grammes of Al$_2$O$_3$ had been suspended. The pH of the vigorously stirred suspension was 5.0 and the temperature was 22° C. After working up the corresponding Ag/Fe-complex cyanide was obtained.

EXAMPLE 4

The experiment described in Example 1a)1 was repeated by dissolving 2.55 grammes of K$_4$Fe(CN)$_6$.3H$_2$O in 100 ml water and slowly injecting the solution into a solution of 3.03 grammes of Mn(NO$_3$)$_2$.4H$_2$O in 1000 ml water wherein 4.00 grammes of Al$_2$O$_3$ had been suspended. The pH of the vigorously stirred suspension was 5.0 and the temperature was 22° C. After working up the corresponding Mn/Fe-complex cyanide was obtained.

EXAMPLE 5

The experiment described in Example 1a)1 was repeated by dissolving 2.32 grammes of K$_4$Mo(CN)$_8$.2H$_2$O in 100 ml water and slowly injecting the solution into a solution of 2.72 grammes of Co(NO$_3$)$_2$.6H$_2$O in 1000 ml water wherein 4.00 grammes of Al$_2$O$_3$ had been suspended. The pH of the vigorously stirred suspension was 5.0 and the temperature was 22° C. After working up the corresponding Co/Mo-complex cyanide was obtained.

EXAMPLE 6

The experiment described in Example 1a)1 was repeated by dissolving 2.39 grammes of K$_4$Mo(CN)$_8$.2H$_2$O in 100 ml water and slowly injecting the solution into a solution of 1.92 grammes of FeCl$_2$.4H$_2$O in 1000 ml water wherein 4.00 grammes of Al$_2$O$_3$ had been suspended. The pH of the vigorously stirred suspension was 5.0 and the temperature was 22° C. After working up the corresponding Fe/Mo-complex cyanide was obtained.

EXAMPLE 7

The experiment described in Example 1a)1 was repeated by dissolving 1.89 grammes of K$_2$Pd(CN)$_4$.1H$_2$O in 100 ml water and slowly injecting the solution into a solution of 1.23 grammes of FeCl$_2$.4H$_2$O in 1000 ml water wherein 4.00 grammes of Al$_2$O$_3$ has been suspended. The pH of the vigorously stirred suspension was 5.0 and the temperature was 22° C. After working up the corresponding Fe/Pd-complex cyanide was obtained.

EXAMPLE 8

Catalyst testing

The catalysts prepared as described in Examples 1a)1, 1a)2 and 1a)3 were tested for the conversion of synthesis gas in a tubular reactor in which the catalyst was operated in the form of a fixed bed with a bulk volume of 1.5 ml.

Prior to testing, the catalysts were reduced with hydrogen under the following conditions: pressure 0.1 MPa; temperature: programmed heating procedure during 64 hours from 100° C. to 275° C.; reduction gas:argon/hydrogen 9:1.

The conditions during the conversion of synthesis gas were pressure 0.1 MPa; temperature 275° C.; $H_2/CO$ ratio: 2; GHSV: 0.35 Nl/l/min.

The three catalysts tested each showed an initial activity of about 90–135 mmol C/kg iron/s, and a steady state activity thereafter about 50 hours of about 20 mmol C/kg iron/s. The catalyst prepared as described in Example 1a)1 showed the highest initial activity and the lowest steady state activity, while the catalyst prepared as described in Example 1a)3 showed the lowest initial activity but the highest steady state activity. From an analysis of the hydrocarbons obtained during the steady state activity of the catalysts it appeared that the Schulz-Flory numbers varied from about 0.4 (catalyst prepared as described in Example 1a)1) to 0.47.

What is claimed is:

1. A process for the preparation of catalysts or catalyst precursors containing at least one metal and/or metal compounds wherein a complex cyanide of the general formula $M_1M_2(CN)_{p-x}(Y)_x$ wherein $M_1$ represents a cationic moiety comprising at least one metal ion, $NH_4^+$ or a quarternary ammonium ion; $M_2$ forms part of the anionic moiety and represents at least one polyvalent metal, CN represents a cyanide moiety as defined hereinbefore, Y represents one or more ligands, p is a number ranging from 2–8, x is a number ranging from 0–4 and p/x is at least 1 when x>0, present on a carrier is subjected to a decomposition treatment under oxidative conditions.

2. The process according to claim 1, wherein the oxidative treatment is carried out at a temperature of at least 200° C.

3. The process according to claim 2, wherein the temperature is between 250° C. and 450° C.

4. The process according to claim 1, wherein the decomposition treatment is carried out in an environment containing at least 0.5% by volume of an oxidizing agent.

5. The process according to claim 4, wherein use is made of oxygen, ozone or a hydroperoxide as an oxidizing agent.

6. The process according to claim 5, wherein use is made of diluted air as an oxidizing agent.

7. The process according to claim 1, wherein use is made of a complex cyanide wherein $M_1$ represents one or more transition metal moieties, a group IVa metal moiety, a group Ia or IIa metal moiety and/or $NH_4^+$, a Group Ib or IIB metal moiety, $M_2$ represents a Group VIb or Group VIII metal moiety, CN represents cyanide, p represents the number 4, 6 or 8 and Y represents a NO group when x is not zero.

8. The process according to claim 7, wherein use is made of a complex cyanide wherein $M_1$ represents one or more Group VIII metal moieties, one or more Group IB metal moieties or one or more Group IVa metal moieties, $M_2$ represents a Fe, Co, Ni, Mo or W metal moiety, p represents the number 4, 6 or 8 and x is zero.

9. A process according to claim 8, wherein use is made of a complex cyanide wherein $M_1$ represents a Cu, Ni or Co moiety and $M_2$ represents a Fe, W or Mo moiety.

10. The process according to claim 1, wherein use is made of a complex cyanide on a carrier selected from the group consisting of a refractory oxide, a zeolite or a mixture thereof.

11. The process according to claim 10, wherein use is made of a complex cyanide applied on a carrier selected from the group consisting of alumina, silica-alumina, titania, magnesia, a crystalline silicate or mixtures thereof.

12. The process according to claim 10, wherein use is made of rom 5% to 95% by weight of carrier, calculated on total weight of dried complex cyanide and carrier.

13. The process according to claim 12, wherein use is made of from 40% to 90% weight of carrier, calculated on total weight of dried complex cyanide and carrier.

14. The process according to claim 1, wherein use is made of a complex cyanide which has been obtained on a carrier by reaction between one or more metal compounds containing $M_1$ moieties and a cyanide containing a $M_2$ moiety.

15. The process according to claim 1, wherein a carrier material is treated with one or more cyanides containing a $M_2$ moiety and after drying is subjected to impregnation with one or more compounds containing $M_1$ moieties so as to form the complex cyanide.

16. The process according to claim 1, wherein a carrier material is treated with one or more compounds containing $M_1$ moieties and after drying is subjected to impregnation with one or more cyanides containing a $M_2$ moiety so as to form the complex cyanide.

17. The process according to claim 15, wherein incipient wetness impregnation is used to introduce either one or more compounds containing one or more $M_1$ moieties or the cyanide containing a $M_2$ moiety on the carrier.

18. The process according to claim 1, wherein use is made of a complex cyanide which has been obtained by treating a carrier with a soluble complex cyanide and drying the thus treated carrier.

19. The process according to claim 1, wherein the oxidative decomposition treatment is followed by an activating treatment under reducing conditions.

20. The process according to claim 19, wherein the activating treatment is carried out in the presence of hydrogen at a temperature up to 500° C. and at a pressure of up to 10 MPa.

21. The process according to claim 20, wherein the reducing treatment is carried out at a temperature in the range between 50° C. and 300° C.

* * * * *